(12) United States Patent
Sasaki

(10) Patent No.: US 8,817,221 B2
(45) Date of Patent: Aug. 26, 2014

(54) TOUCH-TYPE LIQUID CRYSTAL DISPLAY APPARATUS WITH BUILT-IN CONTACT

(75) Inventor: Kazuhiro Sasaki, Sagamihara (JP)

(73) Assignee: Casio Computer Co., Ltd., Tokyo (JP)

( * ) Notice: Subject to any disclaimer, the term of this patent is extended or adjusted under 35 U.S.C. 154(b) by 351 days.

(21) Appl. No.: 13/226,751

(22) Filed: Sep. 7, 2011

(65) Prior Publication Data

US 2012/0057119 A1  Mar. 8, 2012

(30) Foreign Application Priority Data

Sep. 8, 2010  (JP) ................... 2010-201453

(51) Int. Cl.
*G02F 1/1339* (2006.01)
*G06F 3/041* (2006.01)

(52) U.S. Cl.
CPC .......... *G06F 3/0412* (2013.01); *G02F 1/13394* (2013.01)
USPC ............................ 349/156; 349/155; 349/157

(58) Field of Classification Search
CPC .................. G02F 1/13394; G02F 2001/13396; G02F 2001/13398
USPC .................................................. 349/155–157
See application file for complete search history.

(56) References Cited

U.S. PATENT DOCUMENTS

| 7,525,631 | B2 * | 4/2009 | Lee et al. ....................... 349/156 |
| 8,130,209 | B2 | 3/2012 | Chang |
| 8,248,571 | B2 * | 8/2012 | Park .............................. 349/157 |
| 2007/0070281 | A1 * | 3/2007 | Choi .............................. 349/141 |
| 2007/0139604 | A1 * | 6/2007 | Paik et al. ...................... 349/156 |
| 2008/0136980 | A1 | 6/2008 | Rho et al. |
| 2009/0323007 | A1 * | 12/2009 | Shim .............................. 349/155 |
| 2010/0141880 | A1 | 6/2010 | Koito et al. |

FOREIGN PATENT DOCUMENTS

| JP | 10-186317 A | 7/1998 |
| JP | 2000-298280 A | 10/2000 |
| JP | 2007-052369 A | 3/2007 |
| JP | 2007-95044 A | 4/2007 |
| JP | 2008-122913 A | 5/2008 |
| JP | 2008-191671 A | 8/2008 |
| JP | 2010-139555 A | 6/2010 |
| JP | 2010-205611 A | 9/2010 |
| KR | 10-2008-0052836 | 6/2008 |

OTHER PUBLICATIONS

Korean Office Action dated Oct. 29, 2012 (and English translation thereof) in counterpart Korean Application No. 10-2011-0090615.
Japanese Office Action dated Jun. 4, 2013 (and English translation thereof) in counterpart Japanese Application No. 2010-201453.

* cited by examiner

*Primary Examiner* — Huyen Ngo
(74) *Attorney, Agent, or Firm* — Holtz Holtz Goodman & Chick PC

(57) ABSTRACT

A touch-type liquid crystal display apparatus with a built-in contact, includes a substrate support structure supporting a first substrate and a second substrate respectively. The substrate support structure includes a pillar-shaped spacer formed on an opposing surface of the second substrate, and a base region formed on an opposing surface of the first substrate and having a front end with which a front end of the pillar-shaped spacer is in contact. A contact point protrusion is also formed on the opposing surface of the second substrate by using the same material as that of the pillar-shaped spacer.

16 Claims, 9 Drawing Sheets

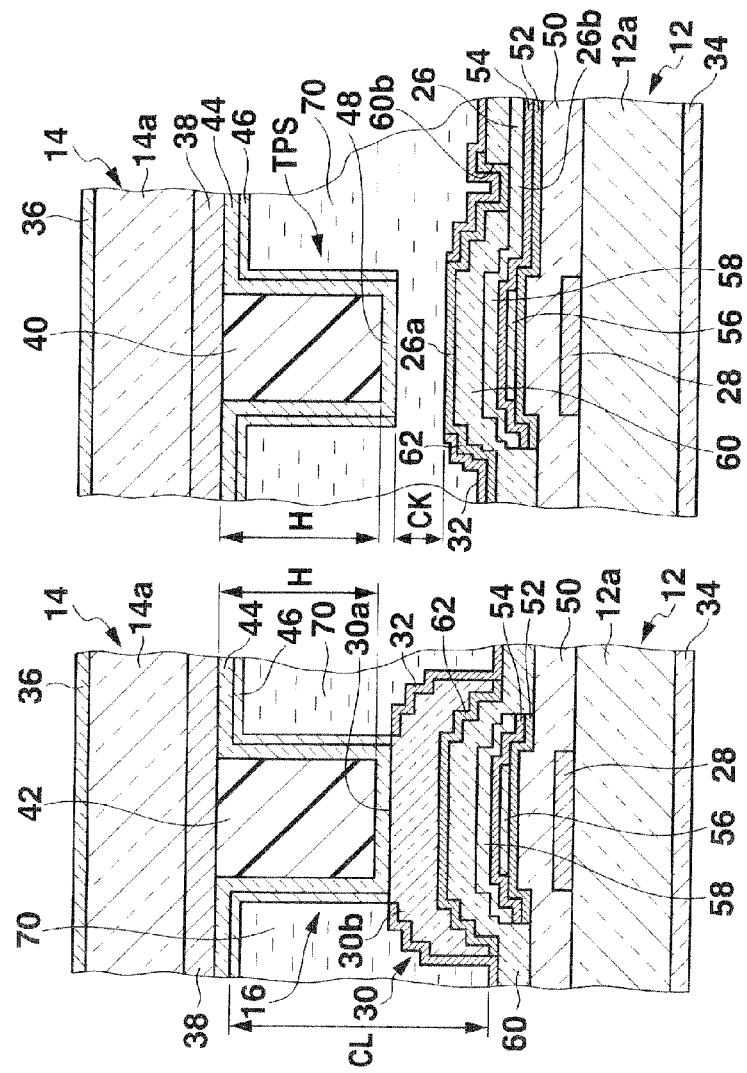

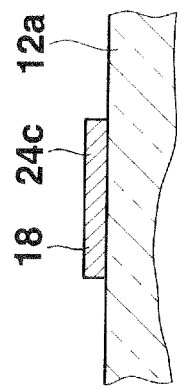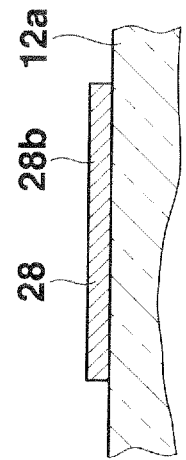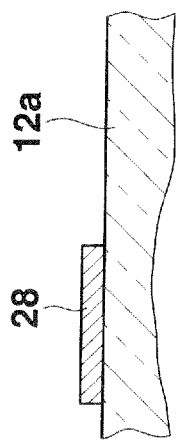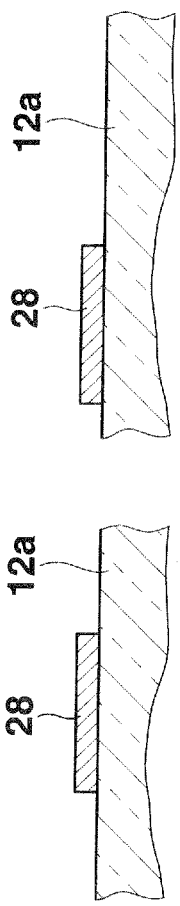

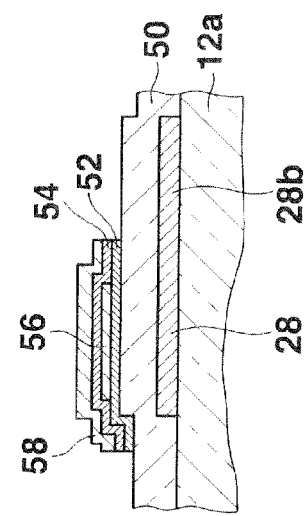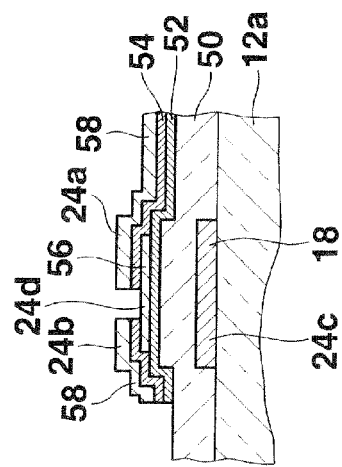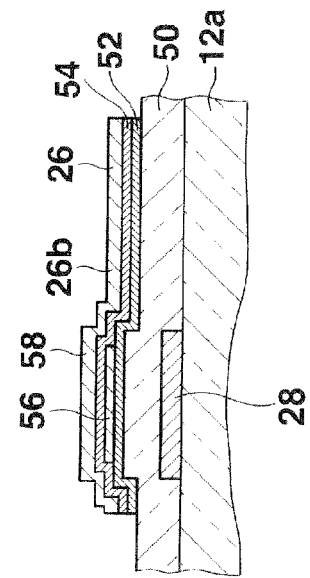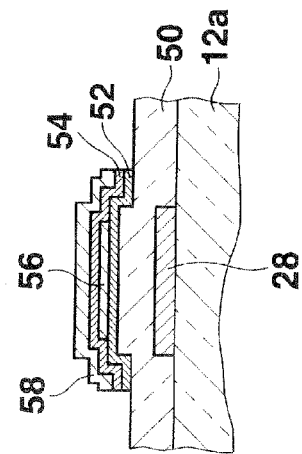

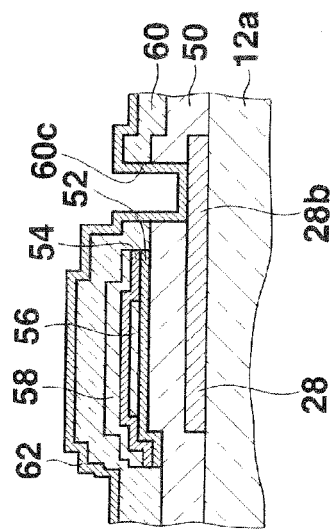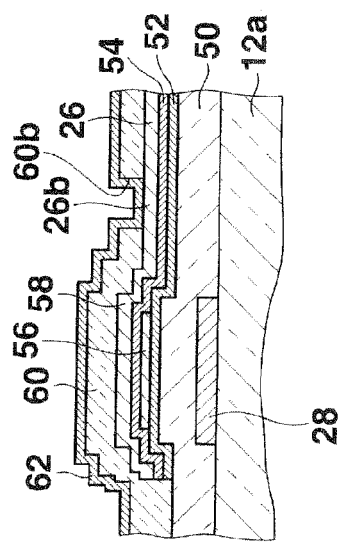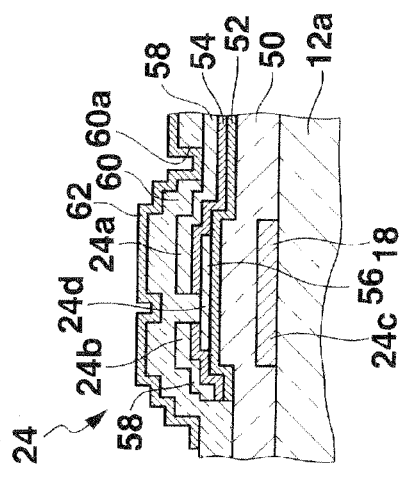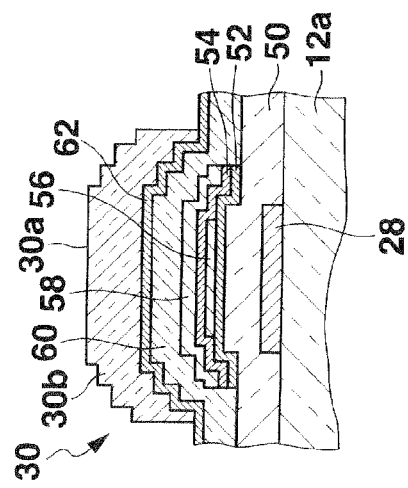

TOUCH-TYPE LIQUID CRYSTAL DISPLAY APPARATUS WITH BUILT-IN CONTACT

CROSS-REFERENCE TO RELATED APPLICATIONS

This application is based upon and claims the benefit of priority from prior Japanese Patent Application No. 2010-201153, filed Sep. 8, 2010, the entire contents of which are incorporated herein by reference.

BACKGROUND OF THE INVENTION

1. Field of the Invention present invention relates to a touch-type liquid crystal display apparatus with a built-in contact.

2. Description of the Related Art

A structure of a conventional touch-type liquid crystal display apparatus with a built-in contact is known from a Japanese Patent Application KOKAI Publication No, 2007-95044.

An essential portion of the conventional touch-type liquid crystal display apparatus with a built-in contact is schematically shown in FIGS. 8 and 9 in an enlarged manner, and the conventional touch-type liquid crystal display apparatus with a built-in contact comprises first and second substrates 100 and 102 arranged to face each other and in parallel to each other. Each of the first and second substrates 100 and 102 is made of transparent glass.

A substrate support structure 104 is interposed between the first substrate 100 and the second substrate 102 so as to support the first and second substrates 100 and 102 in such a manner as to separate the first and second substrates 100 and 102 from each other in parallel to each other.

The first substrate 100 and the second substrate 102 are joined with a frame-shaped seal material at their peripheral edge portions, and liquid crystal 140 is sealed in a space region enclosed by the seal material between the first substrate 100 and the second substrate 102.

The opposing surface of each of the first and second substrates 100 and 102 is formed with a liquid crystal operation structure for selectively operating a plurality of desired portions of the liquid crystal 140 between the first and second substrates 100 and 102 and selectively adjusting light transmittances at the plurality of desired portions. The desired plural portions are called as pixels, and are arranged in a matrix form between the opposing surfaces of the first and second substrates 100 and 102.

The liquid crystal operation structure has includes a plurality of scanning lines 106 and a plurality of signal lines 108, both of which are provided on the opposing surface of the first substrate 100. The scanning lines 106 extend in one direction at each of a plurality of positions spaced apart from each other with predetermined intervals in the other direction (in FIG. 8, in a vertical direction, which is defined as a Y direction) perpendicular to the one direction (in FIG. 8, in a direction from the left to the right or in a direction from the right to the left, which is defined as an X direction) on the opposing surface of the first substrate 100. And, the signal lines 108 extend in the other direction at each of a plurality of positions spaced apart from each other with predetermined intervals in the one direction on the opposing surface of the first substrate 100.

In other words, on the opposing surface of the first substrate 100, the plurality of scanning lines 106 and the plurality of signal lines 108 are arranged in a lattice form, and the plurality of desired pixels arranged in the matrix form of the liquid crystal 140 are located between spaces of the lattice. That is, the plurality of desired pixels arranged in the matrix form of the liquid crystal 140 are enclosed by the plurality of scanning lines 106 and signal lines 108 arranged in the lattice form.

The liquid crystal operation structure further includes a plurality of pixel electrodes 110 arranged in the matrix on the opposing surface of the first substrate 100 so as to correspond to the plurality of desired pixels. Each of the plurality of pixel electrodes 110 is made of transparent conductive material.

The liquid crystal operation structure further includes a plurality of thin film transistors 112 arranged on the opposing surface of the first substrate 100 so as to respectively correspond to the plurality of pixel electrodes 110. Each of the plurality of thin film transistors 112 is connected to the pixel electrode 110 corresponding thereto, one signal line 108 adjacent to the corresponding pixel electrode 110, and one scanning line 106 adjacent to the corresponding pixel electrode 110, and controls operation of the corresponding pixel electrode 110 by controlling a signal given to the corresponding pixel electrode 110 from the above described one signal line 108 in accordance with a signal given from the above described one scanning line 106.

The plurality of thin film transistors 112 as well as the plurality of scanning lines 106, the plurality of signal lines 108, and the plurality of pixel electrodes 110 are formed on the opposing surface of the first substrate 100 at one time using the same manufacturing technique.

In the liquid crystal operation structure, the plurality of scanning lines 106, the plurality of signal lines 108, and the plurality of pixel electrodes 110 are electrically insulated from each other by transparent insulating film portion 114 including multi layered insulating films provided by a manufacturing technique of the thin film transistors 112. The plurality of pixel electrodes 110 are arranged on the transparent insulating film portion 114 on the opposing surface of the first substrate 100.

A drain electrode 112a, a source electrode 112b, and a gate electrode 112c of each of the plurality of thin film transistors 112 are electrically connected to the pixel electrode 110 corresponding thereto, the signal line 108 adjacent to the corresponding pixel electrode 110, and the scanning line 106 adjacent to the corresponding pixel electrode 110, respectively.

A light shielding film 116 (so-called a black mask) in a lattice form is formed on the opposing surface of the second substrate 102 so as to correspond to the plurality of scanning lines 106 and signal lines 108 arranged in the lattice form and enclosing the plurality of desired pixels of the liquid crystal 140 on the opposing surface of the first substrate 100.

Further, on the opposing surface of the second substrate 102, a plurality of red filters, green filters, and blue filters are formed in a predetermined arrangement so as to correspond to the plurality of pixel electrodes 110 on the opposing surface of the first substrate 100.

The liquid crystal operation structure further includes an opposed electrode 118 on the opposing surface of the second substrate 102, and the opposed electrode 118 covers the lattice-formed light shielding film 116, the plurality of red filters, green filters, and blue filters.

The conventional touch-type liquid crystal display apparatus with a built-in contact includes a touch position detection structure provided on the opposing surface of each of the first and second substrates 100 and 102 so as to detect a touch position on an external surface of the second substrate 102.

The touch position detection structure includes X coordinate detection lines 120 and Y coordinate detection lines 122 on the opposing surface of the first substrate 100. The X coordinate detection lines 120 extend along a plurality of desired signal lines 108 in the plurality of signal lines 108 on the opposing surface of the first substrate 100, and the Y coordinate detection lines 122 extend along a plurality of desired scanning lines 106 in the plurality of scanning lines 106 on the opposing surface of the first substrate 100.

The plurality of X coordinate detection lines 120 and the plurality of Y coordinate detection lines 122 are electrically insulated from each other by the multi layered insulating films of the transparent insulating film portion 114, and are also electrically insulated from the plurality of scanning lines 106, the plurality of signal lines 108, and the plurality of pixel electrodes 110 by the multi layered insulating films of the transparent insulating film portion 114.

Each of the plurality of X coordinate detection lines 120 has X coordinate detection contact point regions 120a at a plurality of positions near to crossing positions at which the X coordinate detection line 120 crossing the plurality of Y coordinate detection lines 122. In addition, each of the plurality of Y coordinate detection lines 122 has Y coordinate detection contact point regions 122a at a plurality of positions near to crossing positions at which the Y coordinate detection line 122 crossing the plurality of X coordinate detection lines 120, and the Y coordinate detection contact point regions 122a are located adjacent to the X coordinate detection contact point regions 220a.

The plurality of X coordinate detection contact point regions 120a and the plurality of Y coordinate detection contact point regions 122a are formed at the plurality of positions on the opposing surface of the first substrate 100 by using the same manufacturing technique as that for the plurality of thin film transistors 112, at the same time when the plurality of thin film transistors 112 are formed.

Multi layered insulating films used in the manufacturing technique of the thin film transistor 112 provide multi layered insulating films of the transparent insulating film portion 114.

The touch position detection structure further includes contact point protrusions 124 formed at a plurality of first positions on the opposing surface of the second substrate 102, the plurality of first positions facing the plurality of positions on the first substrate 100, and each contact point protrusion 124 has a predetermined height. The plurality of first positions are on the light shielding film 116 provided on the opposing surface of the second substrate 102. The contact point protrusions 124 are formed on the light shielding film 116 before the opposed electrode 118 is formed, and then the contact point protrusions 124 are covered with the opposed electrode 118.

Parts of the opposed electrode 118 covering protruding end faces (front ends) of the contact point protrusions 124 function as contact point electrodes 124a which act together with pairs of X coordinate detection contact point regions 120a and Y coordinate detection contact point regions 122a arranged adjacent to each other on the opposing surface of the first substrate 100 and facing the protruding end faces (front ends) of the contact point protrusions 124.

The substrate support structure 104 includes a plurality of pillar-shaped spacers 126 formed on the counter electrode 118 covering the light shielding film 116 provided on the opposing surface of the second substrate 102, and the plurality of pillar-shaped spacers 126 are arranged at a plurality of second positions which are different from the plurality of first positions of the plurality of contact point protrusions 124 on the opposing surface of the second substrate 102.

Each of the plurality of contact point protrusions 124 at the plurality of first positions on the light shielding film 116 is directly formed on the light shielding film 116. The plurality of pillar-shaped spacers 126 at the plurality of second positions on the light shielding film 116 are indirectly formed on the light shielding film 116 with the counter electrode 118 interposed therebetween. Each of the contact point protrusions 124 and each of the pillar-shaped spacers 126 are made of the same material and formed by the same manufacturing steps (application of photo-setting resin material, exposing, developing, and setting the material), but are formed in manufacturing periods different from each other to make a height of the contact point protrusion 124 and a height of the pillar-shaped spacer 126 being different from each other. Therefore, a dimensional accuracy of each contact point protrusion 124 is different from a dimensional accuracy of each pillar-shaped spacer 126.

The transparent insulating film portion 114 on the opposing surface of the first substrate 100 as well as the plurality of pixel electrodes 110, the X coordinate detection contact point regions 120a, the Y coordinate detection contact point regions 122a, and the plurality of thin film transistors 112 are covered with a first alignment film 128. When an external surface of the first alignment film 128 is subjected to rubbing processing, the first alignment film 128 is removed from the X coordinate detection contact point regions 120a and the Y coordinate detection contact point regions 122a, so that they are exposed through the first alignment film 128.

The opposed electrode 118 as well as the pillar-shaped spacers 126 on the opposing surface of the second substrate 102 are covered with a second alignment film 130. While an external surface of the second alignment film 130 is subjected to rubbing processing, parts of the second alignment film 130 arranged on the protruding end faces (front ends) of the pillar-shaped spacers 126 and the protruding end faces (front ends) of the contact point protrusions 124 are removed, so that they are exposed through the second alignment film 130.

After a predetermined region on the first alignment film 128 or second alignment film 130 is enclosed by the frame-shaped seal material, the second substrate 102 is placed on the first substrate 100 so that the protruding end faces (front ends) of the plurality of pillar-shaped spacers 126 on the opposing surface of the second substrate 102 are in contact with positions of the first alignment film 128 corresponding to the pillar-shaped spacers 126, on the transparent insulating film portion 114 of the opposing surface of the first substrate 100. Therefore, the first substrate 100 and the second substrate 102 are spaced apart from each other and supported in parallel to each other while they are joined to each other by the frame-shaped seal material. Thereafter, the liquid crystal 140 is injected into an enclosed space region with a first space SG having a predetermined height and defined by the pillar-shaped spacers 126 of the substrate support structure 104 between the first substrate 100 and the second substrate 102, through a liquid crystal injection port formed in for example the predetermined region or the frame-shaped seal material, and finally, the liquid crystal injection port is closed.

At this time, the substrate support structure 104 provides a predetermined second space (contact point region gap) CG between the part (contact point electrode 124a) of the counter electrode 118 on each of the protruding end faces (front ends) of the plurality of contact point protrusions 124 of the second substrate 102 and each of the corresponding X coordinate detection contact point region 120a and the corresponding Y coordinate detection contact point region 122a of the first substrate 100.

On the second substrate 102 of the conventional touch-type liquid crystal display apparatus with a built-in contact, the contact point protrusions 124 are formed before the opposed electrode 118 is formed, and the pillar-shaped spacers 126 of the substrate support structure 104 are formed after the opposed electrode 118 is formed.

Each of the contact point protrusions 124 and each of the pillar-shaped spacers 126 are made of the same material and formed by the same manufacturing steps (application of photo-setting resin material, exposing, developing, and setting the material), but are formed independently in manufacturing periods different from each other as described above. This complicates manufacturing steps of a unit (CF substrate unit CFU) including the second substrate 102 and above described various members that are formed on the opposing surface of the second substrate 102.

Further, since each of the contact point protrusions 124 and each of the pillar-shaped spacers 126 are formed independently in manufacturing periods different from each other so that the height of the contact point protrusion 124 and the height of the pillar-shaped spacer 126 are different from each other, a finishing dimensional accuracy of the contact point protrusion 124 and that of the pillar-shaped spacer 126 are different from each other. This means that the second space (contact point region gap) CC varies in a plurality of combinations between a plurality of CF substrate units CFU and a plurality of TFT substrate units TFU (each TFT substrate unit including the first substrate 100 and above described various members formed on the opposing surface of the first substrate 100).

In other words, each of the plurality of conventional touch-type liquid crystal display apparatuses with built-in contacts requires different level of pushing force applied to the second substrate 102 that is needed to bring the part (contact point electrode 124a) of the counter electrode 118 located on the protruding end face (front end) of the contact point protrusion 124 of the CF substrate unit CFU into contact with the corresponding X coordinate detection contact point region 120a or the corresponding Y coordinate detection contact point region 122a of the first substrate 100, and the amount of deflection of the second substrate 102 caused by the above described pressing force is different in each of the conventional touch-type liquid crystal display apparatuses with built-in contacts. The difference in the amount of deflection of the second substrate 102 results in difference in a thickness of the liquid crystal 140 (i.e., amount of optical transparency) near to the contact point protrusion 124 between the second substrate 102 and the first substrate 100, and this causes each of the conventional touch-type liquid crystal display apparatuses with built-in contacts to have different level of image display quality.

BRIEF SUMMARY OF THE INVENTION

One embodiment of a touch-type liquid crystal display apparatus with a built-in contact of this invention, comprises:

first and second substrates which are arranged to face each other;

liquid crystal which is sandwiched between the first substrate and the second substrate;

at least one opposed electrode which is provided on an opposing surface of the second substrate facing the first substrate;

a plurality of pixel electrodes which is provided on the first substrate to face the opposed electrode, so that a plurality of pixels are formed between the pixel electrodes and the opposed electrode;

a contact point protrusion which is formed on the opposing surface of the second substrate at a first pixel of the plurality of pixels;

a pillar-shaped spacer which is formed on the opposing surface of the second substrate at a second pixel of the plurality of pixels, the pillar-shaped spacer being made of the same material as that of the contact point protrusion;

a contact point region which is provided on the first substrate, wherein the contact point region faces the contact point protrusion; and a base region which is provided on the first substrate, wherein the base region faces the pillar-shaped spacer and the base region has a height higher than the contact point region, wherein a first space is located between the opposed electrode and each of the pixel electrodes and a second space shorter than the first space is located between a front end of the contact point protrusion of the second substrate and the contact point region of the first substrate, by bringing a front end of the pillar-shaped spacer of the second substrate into contact with a front end of the base region of the first substrate.

Additional objects and advantages of the invention will be set forth in the description which follows, and in part will be obvious from the description, or may be learned by practice of the invention. The objects of and advantages of the invention may be realized and obtained by means of the instrumentalities and combinations particularly pointed out hereinafter.

BRIEF DESCRIPTION OF THE SEVERAL VIEWS OF THE DRAWINGS

The accompanying drawings, which are incorporated in and constitute a part of the specification, illustrate embodiments of the invention, and together with the general description given above and the detailed description of the embodiments given below, serve to explain the principles of the invention.

FIGS. 2A, 2B, and 2C are enlarged vertical cross-sectional views, taken along a line VIIB-VIIB, a line VIIC-VIIC, and a line VIID-VIID of FIG. 1, and schematically illustrating surroundings of a base region of the substrate support structure, the X coordinate detection contact point region, the Y coordinate detection contact point region, which are provided on the opposing surface of the first substrate of the TFT substrate unit, as well as a pillar-shaped spacer of the substrate support structure and contact point protrusions, which are provided on an opposing surface of a second substrate of a CF substrate unit to correspond to the above described base region and the X and Y contact point regions of the TFT substrate unit.

FIGS. 3A, 3B, 3C, and 3D are vertical cross-sectional views, taken along the line VIIA-VIIA, the line VIIB-VIIB, the line VIIC-VIIC, and the line VIID-VIID of FIG. 1, and schematically illustrating an initial one of manufacturing steps for manufacturing the thin film transistor (TFT), a pillar-shaped spacer corresponding portion, the X coordinate detection contact point region, and the Y coordinate detection contact point region on the opposing surface of the first substrate of the TFT substrate unit.

FIGS. 4, 4B, 4C, and 4D are vertical cross-sectional views, taken along the line VIIA-VIIA, the line VIIB-VIIB, the line VIIC-VIIC, and the line VIID-VIID of FIG. 1, and schematically illustrating one step which is immediately before a third insulating film (overcoat insulating film) is formed, in the manufacturing steps for manufacturing the thin film transistor (TFT), the pillar-shaped spacer corresponding portion, the X coordinate detection contact point region, and the Y coordinate detection contact point region on the opposing surface of the first substrate of the TFT substrate unit.

FIGS. 6A, 6B, 6C, and 6D are vertical cross-sectional views, taken along the line VIIA-VIIA, the line VIIB-VIIB, the line VIIC-VIIC, and the line VIID-VIID of FIG. 1, and schematically illustrating the other one step which is before a film made of transparent conductive material such as ITO (Indium Tin Oxide) is processed, in the manufacturing steps for making the thin film transistor (TFT), the pillar-shaped spacer corresponding portion, the X coordinate detection contact point region, and the Y coordinate detection contact point region on the opposing surface of the TFT substrate.

DETAILED DESCRIPTION OF THE INVENTION

Figure 1:
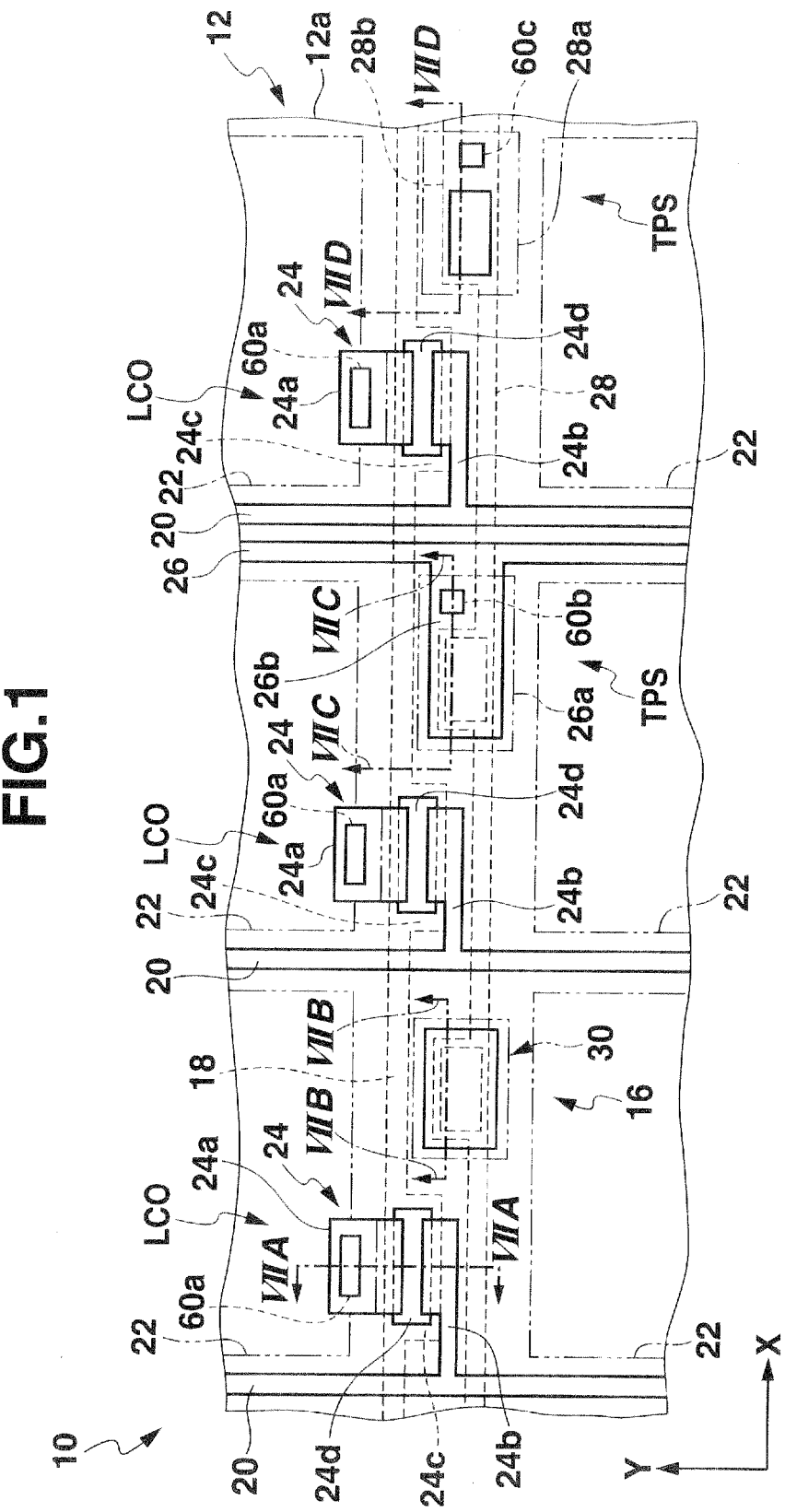
FIG. 1 is an enlarged partial planar view schematically illustrating structures of a thin film transistor (TFT), a pillar-shaped spacer of a substrate support structure, an X coordinate detection contact point region, and a Y coordinate detection contact point region, which are provided on an opposing surface of a first substrate of a TFT substrate unit of a touch-type liquid crystal display apparatus with a built-in contact according to an embodiment of the present invention.

First, a structure of a main part of a touch-type liquid crystal display apparatus with a built-in contact 10 according to an embodiment of the present invention will be described with reference to FIGS. 1, 2A, 2B, and 2C. The touch-type liquid crystal display apparatus with a built-in contact 10 comprises a first substrate unit 12 with a rectangular first substrate 12a and a second substrate unit 14 with a rectangular second substrate 14a. Each of the first substrate 12a and the second substrate 14a is made of transparent glass.

The first substrate 12a and the second substrate 14a are spaced apart from each other and supported in parallel to each other by substrate support structures 16 interposed between the first substrate 12a and the second substrate 14a.

A space between a peripheral portion of an opposing surface of the first substrate 12a and a peripheral portion of an opposing surface of the second substrate 14a is sealed by a frame-shaped seal material, and liquid crystal 70 is held between them.

The opposing surface of each of the first substrate 12a and the second substrate 14a is provided with liquid crystal operation structures LCO for selectively operating liquid crystal 70 at a plurality of desired portions of a predetermined region between the opposing surfaces and thereby selectively adjusting light transmittances at the plurality of desired portions. The desired portions are arranged in a matrix form. Each of the plurality of portions is called as a pixel.

The opposing surface of each of the first substrate 12a and the second substrate 14a is further provided with touch position detection structures TPS for detecting touch positions on an external surface of the second substrate 14a.

The liquid crystal operation structures LCO for selectively operating the liquid crystal 70 at a plurality of desired portions between the opposing surface of the first substrate 12a and the opposing surface of the second substrate 14a and thereby selectively adjusting light transmittances at the plurality of desired portions, includes a plurality of scanning lines 18 and a plurality of signal lines 20 on the opposing surface of the first substrate 12a. Each of the scanning lines 18 extends in one direction (in FIG. 1, a direction from the left to the right or a direction from the right to the left, which is defined as an X direction) at each of a plurality of positions spaced apart from each other with predetermined intervals in the other direction (in FIG. 1, a vertical direction, which defined as a Y direction) perpendicular to the one direction on the opposing surface of the first substrate 12a. Each of the signal lines 20 extends in the other direction (Y direction) at each of a plurality of positions spaced apart from each other with predetermined intervals in the one direction (X direction) on the opposing surface of the first substrate 12a.

The plurality of scanning lines 18 and the plurality of signal lines 20 are arranged in a lattice form on the opposing surface of the first substrate 12a so as to enclose the plurality of desired portions (pixels) of the liquid crystal 70 arranged in the matrix form.

Parts of the liquid crystal operation structures LCO on the opposing surface of the first substrate 12a include a plurality of pixel electrodes 22 arranged in the matrix so as to correspond to the plurality of desired portions (pixels) on the opposing surface of the first substrate 12a. Each of the plurality of pixel electrodes 22 is made of a film of a transparent conductive material such as ITO (Indium Tin Oxide).

Each of the plurality of scanning lines 18 extends along one side of each of the plurality of pixel electrodes 22 arranged in the one direction (X direction), and each of the plurality of signal lines 20 extends along one side of each of the plurality of pixel electrodes 22 arranged in the other direction (Y direction).

Parts of the liquid crystal operation structures LCO on the opposing surface of the first substrate 12a further include a plurality of thin film transistors 24 arranged on the opposing surface of the first substrate 12a so as to correspond to the plurality of pixel electrodes 22. Each of the plurality of thin film transistors 24 is connected to the pixel electrode 22 corresponding thereto, the signal line 20 adjacent to the corresponding pixel electrode 22, and the scanning line 18 adjacent to the corresponding pixel electrode 22, and controls an operation of the corresponding pixel electrode 22 by controlling transmission of a signal to the corresponding pixel electrode 22 from the adjacent signal line 20 in accordance with a signal given from the adjacent scanning line 18.

Each of the plurality of thin film transistors 24 has a drain line 24a connected to the corresponding pixel electrode 22, a source line 24b connected to the signal line 20 adjacent to the corresponding pixel electrode 22, a gate line 24c connected to the scanning line 18 adjacent to the corresponding pixel electrode 22, and a semiconductor ohmic layer 24d interposed between the drain line 24a, the source line 24b, and the gate line 24c. The thin film transistor 24 controls transmission of a signal to the corresponding pixel electrode 22 from the signal line 20 via the source line 24b and the drain line 24a in the ohmic layer 24d in accordance with a signal given from the scanning line 18 via the gate line 24c, thus controlling operation of the corresponding pixel electrode 22.

The plurality of thin film transistors 24 as well as the plurality of scanning lines 18, the plurality of signal lines 20, and the plurality of pixel electrodes 22 are formed on the opposing surface of the first substrate 12a.

In this embodiment, the plurality of scanning lines 18, the plurality of signal lines 20, and the plurality of pixel electrodes 22 are electrically insulated from each other by multiple layers of transparent insulating films explained later in detail during formation of the plurality of thin film transistors 24. The pixel electrodes 22 are arranged on the uppermost transparent insulating film of the multiple layers of transparent insulating films on the opposing surface of the first substrate 12a.

The drain line 24a, the source line 24b, and the gate line 24c of each of the plurality of thin film transistors 24 are electrically connected to the corresponding pixel electrode 22, the signal line 20 adjacent to the corresponding pixel electrode 22, and the scanning line 18 adjacent to the corresponding pixel electrode 22.

The parts of the touch position detection structures TPS arranged on the opposing surface of the first substrate 12a include a plurality of first coordinate detection lines (in this embodiment, X coordinate detection lines) 26 and a plurality of second coordinate detection lines (in this embodiment, Y coordinate detection lines) 28. Each of the first coordinate detection lines 26 extends in the other direction (in this embodiment, the Y direction) crossing the one direction (in this embodiment, the X direction) at right angles at each of a plurality of positions arranged along the one direction on the opposing surface of the first substrate 12a. Each of the second coordinate detection lines 28 extends in the one direction at each of a plurality of positions arranged along the other direction on the opposing surface of the first substrate 12a.

In this embodiment, the plurality of first coordinate detection lines (in this embodiment, the X coordinate detection lines) 26 extend along a plurality of desired signal lines 20 of the plurality of signal lines 20 on the opposing surface of the first substrate 12a, and the plurality of second coordinate detection lines (in this embodiment, the Y coordinate detection lines) 28 extend along a plurality of desired scanning lines 18 of the plurality of scanning lines 18 on the opposing surface of the first substrate 12a.

Each of the first coordinate detection lines (in this embodiment, the X coordinate detection lines) 26 has first coordinate detection contact point regions (in this embodiment, X coordinate detection contact point regions) 26a at a plurality of positions along the other direction (in this embodiment, the Y direction). The first coordinate detection contact point regio (the X coordinate detection contact point regions) 26a of each of the first coordinate detection lines (the X coordinate detection lines) 26 are arranged near to crossing positions at which each of the first coordinate detection lines (the X coordinate detection lines) 26 crosses the plurality of second coordinate detection lines (the Y coordinate detection lines) 28.

Each of the plurality of second coordinate detection lines (in this embodiment, the Y coordinate detection lines) 28 has second coordinate detection contact point regions (in this embodiment, Y coordinate detection contact point regions) 28a at a plurality positions arranged along the one direction (in this embodiment, the X direction). The second coordinate detection contact point regions (the Y coordinate detection contact point regions) 28a of each of the second coordinate detection lines (the Y coordinate detection lines) 28 are arranged adjacent to the plurality of pixel electrodes 22 located opposite to the plurality of pixel electrodes 22 arranged adjacent to the first coordinate detection contact point regions (the X coordinate detection contact point regions) 26a with respect to the first coordinate detection line (the X coordinate detection line) 26, of the plurality of pixel electrodes 22 arranged in the one direction (the X direction) in which the second coordinate detection lines (the Y coordinate detection lines) 28 extend.

Parts of the substrate support structures 16 provided on the opposing surface of the first substrate 12a include a plurality of base regions 30 having the same height. The plurality of base regions 30 are arranged adjacent to the desired second coordinate detection lines (the Y coordinate detection lines) 28, at positions different from the plurality of first coordinate detection contact point regions (the X coordinate detection contact point regions) 26a and the plurality of second coordinate detection contact point regions (the Y coordinate detection contact point regions) 28a.

The plurality of base regions 30 are provided by using a formation technique of the thin film transistor 24 during the formation of the plurality of thin film transistors 24.

That is, in this embodiment, the parts of the liquid crystal operation structures LCO, the parts of the touch position detection structures TPS, and the parts of the substrate support structures 16, provided on the opposing surface of the first substrate 12a, are commonly provided by using the same formation technique.

FIGS. 1, 2A, 2B, and 2C show two-dimensional arrangement and three-dimensional arrangements of the parts of the liquid crystal operation structures LCO, the parts of the touch position detection structures TPS, and one of the parts of the substrate support structures 16, on the opposing surface of the first substrate 12a in detail. And, the parts of the liquid crystal operation structures LCO include the scanning lines 18, the signal lines 20, the pixel electrodes 22, and the thin film transistors 24; the parts of the touch position detection structures TPS include the first coordinate detection lines (the X coordinate detection lines) 26, the first coordinate detection contact point regions (the X coordinate detection contact point regions) 26a, the second coordinate detection lines (the Y coordinate detection lines) 28, and the second coordinate detection contact point regions (the Y coordinate detection contact point regions) 28a; and the parts of the substrate support structures 16 include the base regions 30.

Specifically in FIG. 1, it can be seen that the plurality of thin film transistors 24 are arranged at the plurality of positions on the scanning line 18 so as to correspond to the plurality of pixel electrodes 22 arranged along the scanning line 18 extending in the one direction (the X direction), and that the base region 30, the first coordinate detection contact point region (the X coordinate detection contact point region) 26a, and the second coordinate detection contact point region (the Y coordinate detection contact point region) 28a are arranged in a predetermined order at the plurality of positions between the plurality of thin film transistors 24 on the scanning line 18 that is arranged adjacent to and along the second coordinate detection line (the Y coordinate detection line) 28.

From FIG. 1, it can be further seen that portions of the second coordinate detection line (the coordinate detection line) 28 corresponding to the second coordinate detection contact point regions (the Y coordinate detection contact point regions) 28a provide connection portions 28b for connection with the second coordinate detection contact point regions (the Y coordinate detection contact point regions) 28a. Further, it can be seen that connection portions 26b for connection with the first coordinate detection contact point regions (the X coordinate detection contact point regions) 26a extend from the first coordinate detection line (the X coordinate detection line) 26 at positions of the first coordinate detection line (the X coordinate detection line) 26 corresponding to the first coordinate detection contact point regions (the X coordinate detection contact point regions) 26a, wherein the first coordinate detection lines (the X coordinate detection lines) 26 are electrically insulated from the second coordinate detection lines (Y coordinate detection lines) 28 by the transparent insulating film portion including the multiple layers of insulating films as will be described later.

From FIGS. 2A, 2B, and 2C, it can be seen that the signal line 20, the pixel electrode 22, the thin film transistor 24, the first coordinate detection line (the X coordinate detection line) 26, the first coordinate detection contact point region (the X coordinate detection contact point region) 26a, the second coordinate detection line (the Y coordinate detection line) 28, the second coordinate detection contact point region (the Y coordinate detection contact point region) 28a, and the base region 30 are arranged spaced apart from each other in the vertical direction on the opposing surface of the first substrate 12a, and they are insulated from each other by the transparent insulating film portion including the multiple layers of insulating films as will be described later.

FIGS. 2A, 2B, and 2C further shows a first alignment film 32 applied to a position of the opposing surface of the first substrate 12a, the position being closest to the opposing surface of the second substrate 14a. A height of each of the first coordinate detection contact point region (the X coordinate detection contact point region) 26a, the second coordinate detection contact point region (the Y coordinate detection contact point region) 28a, and a protruding end face (a front end) 30a of the base region 30 from the opposing surface of the first substrate 12a is relatively larger that of other position on the opposing surface of the first substrate 12a, and a thickness of the first alignment film 32 at each of above described them is thinner than that of the first alignment film 32 at the other position on the opposing surface of the first substrate 12a.

Therefore, when an external surface of the first alignment film 32 is subjected to an alignment process including a rubbing process just after the first alignment film 32 is applied, the relatively thin parts of the first alignment film 32 located on the protruding end face (the front end) 30a of the base region 30, the first coordinate detection contact point region (the X coordinate detection contact point region) 26a, and the second coordinate detection contact point region (the Y coordinate detection contact point region) 28a are removed from them.

FIGS. 2A, 2B, and 2C still further show a polarizing plate 34 attached to an external surface of the first substrate 12a and a polarizing plate 36 attached to an external surface of the second substrate 14a.

FIGS. 2A, 2B, and 2C also show a lattice-like light shielding film 38 (so-called a black mask) formed on the opposing surface of the second substrate 14a so as to face the plurality of scanning lines 18 and the plurality of signal lines 20 both of which are arranged in the lattice form to enclose the plurality of desired pixels on the opposing surface of the first substrate 12a.

When the first substrate 12a is seen from the polarization plate 36 of the external surface of the second substrate 14a, the lattice-like light shielding film 38 covers the plurality of scanning lines 18 and the plurality of signal lines 20 on the opposing surface of the first substrate 12a. The lattice-like light shielding film 38 also faces the plurality of second coordinate detection lines (the Y coordinate detection lines) 28 arranged along the desired scanning lines 18 and the plurality of first coordinate detection lines (the X coordinate detection lines) 26 arranged along the desired signal lines 20, and covers the plurality of second coordinate detection lines (the Y coordinate detection lines) 28 and the plurality of first coordinate detection lines (the X coordinate detection lines) 26. The light shielding film 38 further covers the plurality of thin film transistors 24, the plurality of first coordinate detection contact point regions (the X coordinate detection contact point regions) 26a, the plurality of second coordinate detection contact point regions (the Y coordinate detection contact point regions) 28a, and the plurality of base regions 30, which are arranged along the plurality of second coordinate detection lines (the Y coordinate detection lines) 28. The plurality of pixel electrodes 22 on the opposing surface of the first substrate 12a correspond to a plurality of openings of the lattice-like light shielding film 38, so that the plurality of pixel electrodes 22 are not covered with the light shielding film 38.

A plurality of color filters including, e.g., red filters, green filters, and blue filters in a predetermined arrangement are further formed on the opposing surface of the second substrate 14a to correspond to the plurality of openings in the lattice-like light shielding film 38, i.e., to correspond to the plurality of pixel electrodes 22 on the opposing surface of the first substrate 12a. A part of each of the color filters is also formed on the light shielding film 38.

As shown in FIGS. 2A, 2B, and 2C, the remaining parts of the touch position detection structures TPS on the opposing surface of the second substrate 14a includes a plurality of contact point protrusions 40 formed at a plurality of first positions of the light shielding film 38 on the opposing surface of the second substrate 14a, and the plurality of first positions face the plurality of first coordinate detection contact point regions (the X coordinate detection contact point regions) 26a and the plurality of second coordinate detection contact point regions (the Y coordinate detection contact point regions) 28a on the opposing surface of the first substrate 12a. The plurality of contact point protrusions 40 have the same structure and the same height defined in advance as to each other. FIGS. 2A, 2B, and 2C show one contact point protrusion 40 facing one of the plurality of first coordinate detection contact point regions (the X coordinate detection contact point regions) 26a on the opposing surface of the first substrate 12a and further one contact point protrusion 40 facing one of the plurality of second coordinate detection contact point regions (the Y coordinate detection contact point regions) 28a on the opposing surface of the first substrate 12a.

The remaining parts of the substrate support structure 16 on the opposing surface of the second substrate 14a includes a plurality of pillar-shaped spacers 42 formed at a plurality of second positions of the light shielding film 38 on the opposing surface of the second substrate 14a. The plurality of second positions are different from the plurality of first positions and face the plurality of base regions 30 on the opposing surface of the first substrate 12a. The plurality of pillar-shaped spacers 42 have the same height defined in advance as to each other, and have the same structure as that of each of the plurality of contact point protrusions 40. Each of the plurality of pillar-shaped spacers 42 is made of the same material as that of each of the plurality of contact point protrusions 40, and is formed by the same manufacturing steps (application of a photo-setting resin material, exposing, developing, and setting the material) as that of each of the plurality of contact point protrusions 40. Therefore, the plurality of pillar-shaped spacers 42 and the plurality of contact point protrusions 40 are respectively formed at the plurality of first positions and the plurality of second positions of the light shielding film 38 on the opposing surface of the second substrate 14a with the same dimensional accuracy as to each other, and protrude with the same height H as to each other from the light shielding film 38 on the opposing surface of the second substrate 14a, i.e., from the opposing surface of the second substrate 14a.

When the part of each color filter is formed on the light shielding film 38 as described above, the part of each color filter is formed to avoid the first and second positions where the plurality of contact point protrusions 40 and the plurality of pillar-shaped spacers 42 are formed on the light shielding film 38.

The remaining parts of the liquid crystal operation structures LCO on the opposing surface of the second substrate 14a includes an opposed electrode 44 covering all the members formed on the opposing surface of the second substrate 14a (i.e., the light shielding film 38, the plurality of red filters, green filters, and blue filters, the plurality of pillar-shaped spacers 42, and the plurality of contact point protrusions 40). The opposed electrode 44 on the opposing surface of the second substrate 14a faces the plurality of pixel electrodes 22 on the opposing surface of the first substrate 12a. The opposed electrode 44 is formed by using a transparent conductive material.

The opposed electrode 44 is covered with a second alignment film 46. However, a thickness of each of parts of the second alignment film 46 on the protruding end face (front end) of each of the plurality of pillar-shaped spacers 42 and on the protruding end face (front end) of each of the plurality of contact point protrusions 40 is thinner than that of the other part of the second alignment film 46 on the opposing surface of the second substrate 14a because the protruding end face (front end) of each of the pillar-shaped spacers 42 and contact point protrusions 40 is higher than the opposing surface of the second substrate 14a.

Therefore, when an external surface of the second alignment film 46 is subjected to an alignment process including a rubbing process just after the second alignment film 46 is applied, the relatively thin parts of the second alignment film 46 located on the protruding end faces (front ends) of the pillar-shaped spacers 42 and contact point protrusions 40 are removed from them. As a result, parts of the opposed electrode 44 exposed on protruding end faces (front ends) of the contact point protrusions 40 can also function as contact point electrodes 48 covering the protruding end faces (front ends) of the contact point protrusions 40.

In this embodiment, the first substrate unit 12 is structured by: the first substrate 12a; the plurality of scanning lines 18, the plurality of signal lines the plurality of pixel electrodes 22, the plurality of thin film transistors 24, and the above described multiple layers of transparent insulating layers, which constitute the parts of the liquid crystal operation structures LCO on the opposing surface of the first substrate 12a; the plurality of first coordinate detection lines (the X coordinate detection lines) 26 respectively provided with the plurality of first coordinate detection contact point regions (the X coordinate detection contact point regions) 26a and the plurality of second coordinate detection lines (the Y coordinate detection lines) 28 respectively provided with the plurality of second coordinate detection contact point regions (the Y coordinate detection contact point regions) 28a, which constitute the parts of the touch position detection structure TPS on the opposing surface of the first substrate 12a; the plurality of base regions 30, which constitute the parts of the substrate support structures 16 on the opposing surface of the first substrate 12a; and the first alignment film 32 on the opposing surface of the first substrate 12a. The first substrate unit 12 is also referred to as a TFT (Thin Film Transistor) substrate unit, and can be independently handled.

On the other hand, the second substrate unit 14 is structured by: the second substrate 14a; the light shielding film 38 on the opposing surface of the second substrate 14a; the plurality of color filters including, e.g., the plurality of red filters, green filters, and blue filters, on the opposing surface of the second substrate 14a; the opposed electrode 44 which constitute the remaining parts of the liquid crystal operation structures LCO on the opposing surface of the second substrate 14a; the plurality of contact point protrusions 40 and the contact point electrodes 48 of the protruding end faces (front ends) of the contact point protrusions 40, which constitute the remaining parts of the touch position detection structures TPS on the opposing surface of the second substrate 14a; the plurality of pillar-shaped spacers 42, which constitute the remaining parts of the substrate support structures 16 on the opposing surface of the second substrate 14a; and the second alignment film 46 on the opposing surface of the second substrate 14a. The second substrate unit 14 is also referred to as a CF (Color Filter) substrate unit, and can be independently handled.

After the predetermined region on the first alignment film 32 of the first substrate unit (TFT substrate unit) 12 or on the second alignment film 46 of the second substrate unit (CF substrate unit) 14 is enclosed by the frame-shaped seal material, the second substrate unit (CF substrate unit) 14 is placed on the first substrate unit (TFT substrate unit) 12 so that the protruding end faces (front ends) of the plurality of pillar-shaped spacers 42 of the substrate support structure 16 on the opposing surface of the second substrate 14a are in contact with the protruding end faces (front ends) 30a of the plurality of corresponding base regions 30 on the opposing surface of the first substrate 12a. Accordingly, the first substrate unit (the TFT substrate unit) 12 and the second substrate unit (the CO substrate unit) 14 are joined with each other by the seal material, and the first substrate 12a and the second substrate 14a are spaced apart from each other and supported in parallel to each other with a predetermined first space CL between them by the substrate support structures 16. Thereafter, the liquid crystal 70 is injected into the enclosed space of enclosed by the frame-shaped seal material between the first substrate unit (the TFT substrate unit) 12 and the second substrate unit (the CF substrate unit) 14, through a liquid crystal injection port formed in for example the predetermined region or the seal material, and finally, the liquid crystal injection port is closed.

At this time, the plurality of pillar-shaped spacers 42 on the opposing surface of the second substrate 14a and the plurality of base regions 30 on the opposing surface of the first substrate 12a, which provide the substrate support structures 16, provides a predetermined second space (a contact point region gap) CK between each of the contact point electrodes 48, i.e., each of the portions of the opposed electrodes 44 on the protruding end faces (front ends) of the plurality of contact point protrusions 40 on the second substrate 14a, and each of the corresponding first coordinate detection contact point regions (the X coordinate detection contact point regions) 26a and corresponding second coordinate detection contact point regions (the Y coordinate detection contact point regions) 28a on the first substrate 12a. Naturally, the second space (the contact point region gap) CK is shorter than the predetermined first space CL set by the substrate support structures 16 between the first substrate 12a and the second substrate 14a.

In the followings, manufacturing steps commonly applied to each of the thin film transistors 24, the part of each of the touch position detection structures TPS including the first coordinate detection contact point regions (the X coordinate detection contact point regions) 26a and the second coordinate detection contact point regions (the Y coordinate detection contact point regions) 28a, and the part of each of the substrate support structures 16, which are formed on the opposing surface of the first substrate 12a, will be explained with reference to FIGS. 3A, 35, 3C, and 3D, to FIGS. 7A, 7B, 7C, and 7D.

In these figures, FIGS. 3A, 4A, 5A, 6A, and 7A are vertical cross-sectional views taken along a cross sectional line VIIA-VIIA of FIG. 1, and schematically show that how the thin film transistor 24 is formed gradually on the opposing surface of the first substrate 12a of the touch-type liquid crystal display apparatus with a built-in contact 10 shown in FIG. 1.

FIGS. 3B, 4B, 5B, 6B, and 7B are vertical cross-sectional views taken along a cross sectional line VIIB-VIIB of FIG. 1, and schematically show that how the base region 30 of the substrate support structure 16 is formed gradually on the opposing surface of the first substrate 12a of the touch-type liquid crystal display apparatus with a built-in contact 10 shown in FIG. 1, by the same manufacturing steps as those of the thin film transistor 24, during a formation of the thin film transistors 24.

FIGS. 3C, 4C, 5C, 6C, and 7C are vertical cross-sectional views taken along a cross sectional line VIIC-VIIC of FIG. 1, and schematically show that how the first coordinate detection contact point region (the X coordinate detection contact point region) 26a included in the touch position detection structure TPS is formed gradually on the opposing surface of the first substrate 12a of the touch-type liquid crystal display apparatus with a built-in contact 10 shown in FIG. 1, by the same manufacturing steps as those of the thin film transistor 24, during the formation of the thin film transistors 24.

FIGS. 3D, 4D, 5D, 6D, and 7D are vertical cross-sectional views taken along a cross sectional line VIID-VIID of FIG. 1, and schematically show that how the second coordinate detection contact point region (the Y coordinate detection contact point region) 28a included in the touch position detection structure IFS is formed gradually on the opposing surface of the first substrate 12a of the touch-type liquid crystal display apparatus with a built-in contact 10 shown in FIG. 1, by the same manufacturing steps as those of the thin film transistor 24, during the formation of the thin film transistors 24.

First, as shown in FIGS. 3A, 3B, 3C, and 3D, the scanning line 18 and the second coordinate detection line (the Y coordinate detection line) 28 extending along the scanning line 18 are formed on the opposing surface of the first substrate 12a by using a film of conductive metal film, i.e., a gate metal (gate electrode), with a photolithography method. And, as shown in FIG. 1, a part of the scanning line 18 corresponding to each of the plurality of thin film transistors 24 provides the gate line 24c for each of the thin film transistors 24. Further, as shown in FIG. 1, a part of the second coordinate detection line (the Y coordinate detection line) 28 corresponding to each of the second coordinate detection contact point regions (the Y coordinate detection contact point regions) 28a provides the connection portion 28b for each of the second coordinate detection contact point regions (the Y coordinate detection contact point regions) 28a.

Next, as shown in FIGS. 4A, 45, 4C, and 4D, a transparent first insulating film (gate insulating film) 50 made of, e.g., SiNx is formed on the opposing surface of the first substrate 12a to cover the scanning line 18 and the second coordinate detection line (the Y coordinate detection line) 28.

Then, for example, an a-Si layer 52 and a n$^+$a-Si layer 54 are laminated on the transparent first insulating film (gate insulating film) 50 in this order while a second insulating film (channel protective layer) 56 made of, e.g., SiNx, is partially interposed between the a-Si layer 52 and the n$^+$a-Si layer 54.

Subsequently, a conductive metal film 58 made of, i.e., a drain metal (drain electrode), is formed to cover the n$^+$a-Si layer 54. The conductive metal film 58 provides the signal line 20 near to the thin film transistor 24 and the first coordinate detection line (the X coordinate detection lines) 26 near to the first coordinate detection contact point region (the X coordinate detection contact point region) 26a, as shown in FIG. 1.

As described above with reference to FIG. 1, the portion of the first coordinate detection line (the X coordinate detection line) 26 corresponding to the first coordinate detection contact point region (the X coordinate detection contact point region) 26a provides the connection portion 26b for the first coordinate detection contact point region (the X coordinate detection contact point region) 26a.

As shown in FIG. 4A illustrating a part of the vertical cross section taken along the line VIIA-VIIA of FIG. 1, each of the n$^+$a-Si layer 54 and the conductive metal film 58 is divided into two parts, i.e., a part closer to the pixel electrode 22 and a part farther from the pixel electrode 22.

A laminated combination of the a-Si layer 52, the second insulating film (the channel protective layer) 56, and the n$^+$a-Si layer 54 divided into the two parts as described above provides the ohmic layer 24d of the thin film transistor 24. One of the two divided parts of the conductive metal film 58 closer to the pixel electrode 22 provides the drain line 24a of the thin film transistor 24 as shown in FIG. 1. The other of the two divided parts of the conductive metal film 58 farther from the pixel electrode 22 provides the source line 24b extending from the signal line 20 to the thin film transistor 24.

Subsequently, as shown in FIGS. 5A, 5B, 5C, and 5D, a transparent third insulating film (overcoat insulating film) 60 made of, e.g., SiNx, is formed to cover the conductive metal film 58.

Figure 5A:
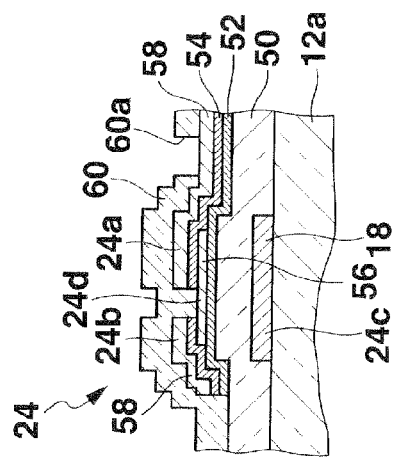
FIGS. 5A, 5B, 5C, and 5D are vertical cross-sectional views, taken along the line VIIA-VIIA, the line VIIB-VIIB, the line VIIC-VIIC, and the line VIID-VIID of FIG. 1, and schematically illustrating another one step which is immediately after the third insulating film (overcoat insulating film) is formed, in the manufacturing steps for manufacturing the thin film transistor (TFT), the pillar-shaped spacer corresponding portion, the X coordinate detection contact point region, and the Y coordinate detection contact point region on the opposing surface of the first substrate of the TFT substrate unit.

As shown in FIG. 5A, a contact hole 60a is formed in a part of the third insulating film (the overcoat insulating film) 60 corresponding to the drain line 24a of the thin film transistor 24, and the contact hole 60a exposes the drain line 24a. The contact hole 60a for each of the thin film transistors 24 is also shown in FIG. 1.

Figure 5D:
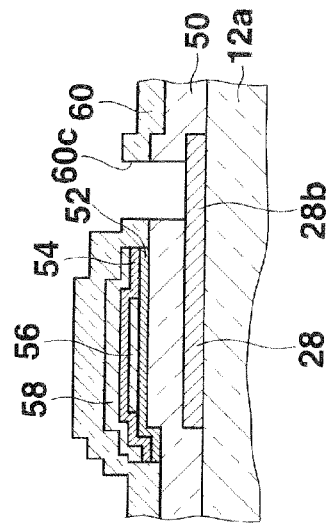
Figure 5C:
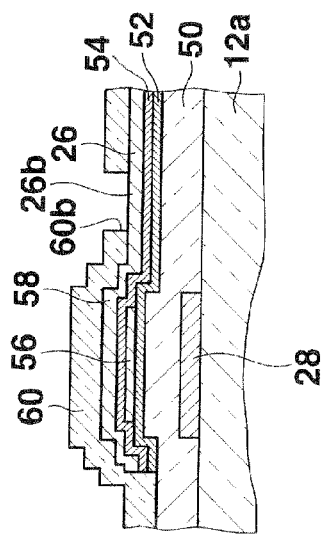
Figure 5B:
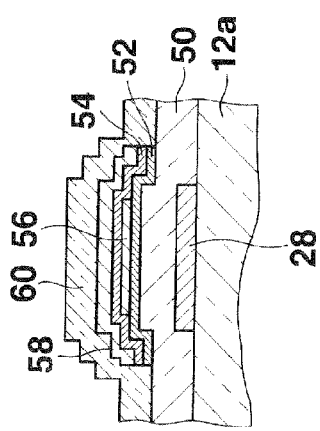

As shown in FIG. 5C, a contact hole 60b is formed in a part of the third insulating film (the overcoat insulating film) 60 corresponding to the connection portion 26b for each of the first coordinate detection contact point regions (the X coordinate detection contact point regions) 26a of each of the first coordinate detection lines (the X coordinate detection lines) 26. The contact hole 60b exposes the connection portion 26b. The contact hole 60b is also shown in FIG. 1.

Further, as shown in FIG. 5D, a contact hole 60c is formed in a part of the third insulating film (the overcoat insulating film) 60 corresponding to the connection portion 28b for each of the second coordinate detection contact point regions (the Y coordinate detection contact point regions) 28a of each of the second coordinate detection lines (the coordinate detection lines) 28. The contact hole 60c further penetrates the first insulating film (the gate insulating film) 50 existing between the third insulating film (the overcoat insulating film) 60 and the connection portion 28b for each of the second coordinate detection contact point regions (the Y coordinate detection contact point regions) 28a of each of the second coordinate detection lines (the Y coordinate detection lines) 28, so that the contact hole 60c exposes the connection portion 28b.

At this stage, in the corresponding portion of the thin film transistor 24 as shown in FIG. 5A, the thin film transistor 24 is provided by: the gate line 24c of the scanning line 18; a part of the first insulating film (the gate insulating film) 50 overlapping the gate line 24c; the ohmic layer 24d for the semiconductor including the a-Si layer 52, the second insulating film (the channel protective layer) 56, and the two divided parts of the n⁺a-Si layer 54, which are overlapping the above described part of the first insulating film (gate insulating film) 50; the drain line 24a and the source line 24b on the two divided parts of the n⁺a-Si layer 54 of the ohmic layer 24d; and the third insulating film (the overcoat insulating film) 60 covering the drain line 24a and the source line 24b.

Next, as shown in FIGS. 6A, 6B, 6C, and 60, a transparent conductive film 62 made of a material such as ITO (Indium Tin Oxide) is formed to cover the third insulating film (the overcoat insulating film) 60.

As shown in FIG. 6A, the conductive film 62 is also formed in the contact hole 60a for exposing the drain line 24a, and is electrically connected to the drain line 24a. As shown in FIG. 6C, the conductive film 62 is further formed in the contact hole 60b for exposing the connection portion 26b for the first coordinate detection contact point region (the X coordinate detection contact point region) 26a, and electrically connected to the connection portion 26b. More further, as shown in FIG. 6D, the conductive film 62 is also formed in the contact hole 60c for exposing the connection portion 28b for the second coordinate detection contact point region (the Y coordinate detection contact point region) 28a, and is electrically connected to the connection portion 28b.

After the conductive film 62 is formed, the vertical cross section of the thin film transistor 24 taken along the line VIIA-VIIA of FIG. 1 and shown in FIG. 6A, the vertical cross section of the base region 30 taken along the line VIIB-VIIB of FIG. 1 and shown in FIG. 6B, the vertical cross section of the one part of one touch position detection structure TPS, including the first coordinate detection contact point region (the X coordinate detection contact point region) 26a, taken along the line VIIC-VIIC of FIG, and shown in FIG. 6C, and the vertical cross section of the one part of another touch position detection structure TPS, including the second coordinate detection contact point region (the Y coordinate detection contact point region) 28a, taken along the line VIID-VIID of FIG. 1 and shown in FIG. 6D, are commonly formed at the same time on the opposing surface of the first substrate 12a by the above described manufacturing steps for forming the thin film transistor 24. Therefore, they all have the same height from the opposing surface of the first substrate 12a.

Subsequently, as shown in FIG. 6B, a height adjustment portion 30b is further formed on a part of the conductive film 62 for the base region 30 by using a transparent fourth insulating film (a base insulating film) made of, e.g., SiNx, until the height adjustment portion 30b has a predetermined height, and a top face thereof provides the protruding end face (the front end) 30a of the base region 30.

Finally, most of the conductive film 62 is removed excepting the following parts shown in FIGS. 7A, 7B, 7C, and 7D.

Figure 7A:
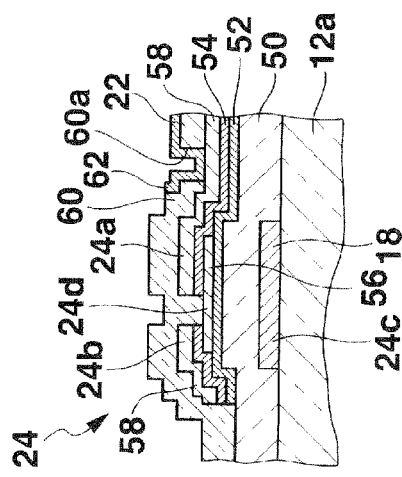
FIGS. 7A, 7B, 7C, and 7D are vertical cross-sectional views, taken along the line VIIA-VIIA, the line VIIB-VIIB, the line VIIC-VIIC, and the line VIID-VIID of FIG. 1, and schematically illustrating a further one step which follows a completion of the thin film transistor (TFT), the X coordinate detection contact point region, and the Y coordinate detection contact point region and which is immediately after the pillar-shaped spacer corresponding portion is completed, in the manufacturing steps for manufacturing the thin film transistor (TFT), the pillar-shaped spacer corresponding portion, the X coordinate detection contact point region, and the Y coordinate detection contact point region on the opposing surface of the TFT substrate.

In FIG. 7A showing the vertical cross section of the thin film transistor 24 and its surrounding, a part of the conductive film 62 located in the contact hole 60a and electrically connected to the drain line 24a, a part of the conductive film 62 extending from the contact hole 60a to the pixel electrode 22 corresponding thereto, and a part the conductive film 62 corresponding of the pixel electrode 22 are not removed but are left.

Figure 7D:
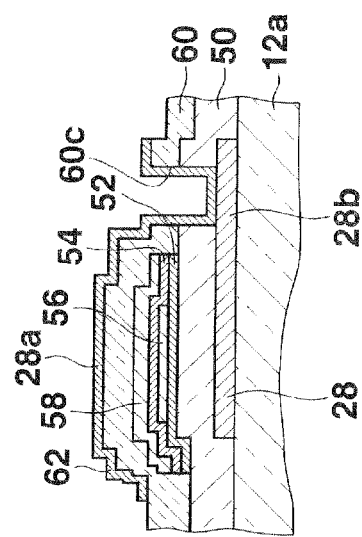
Figure 7C:
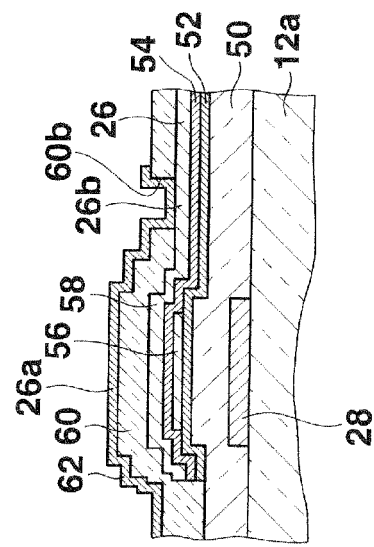
Figure 7B:
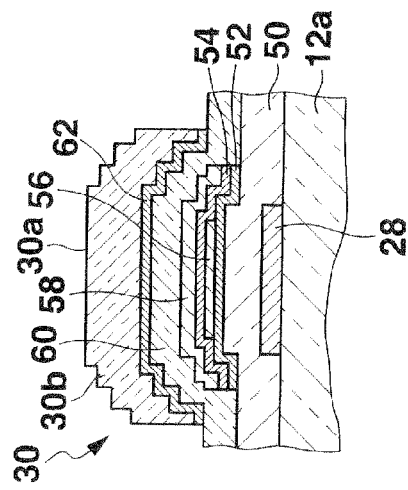
Figure 8:
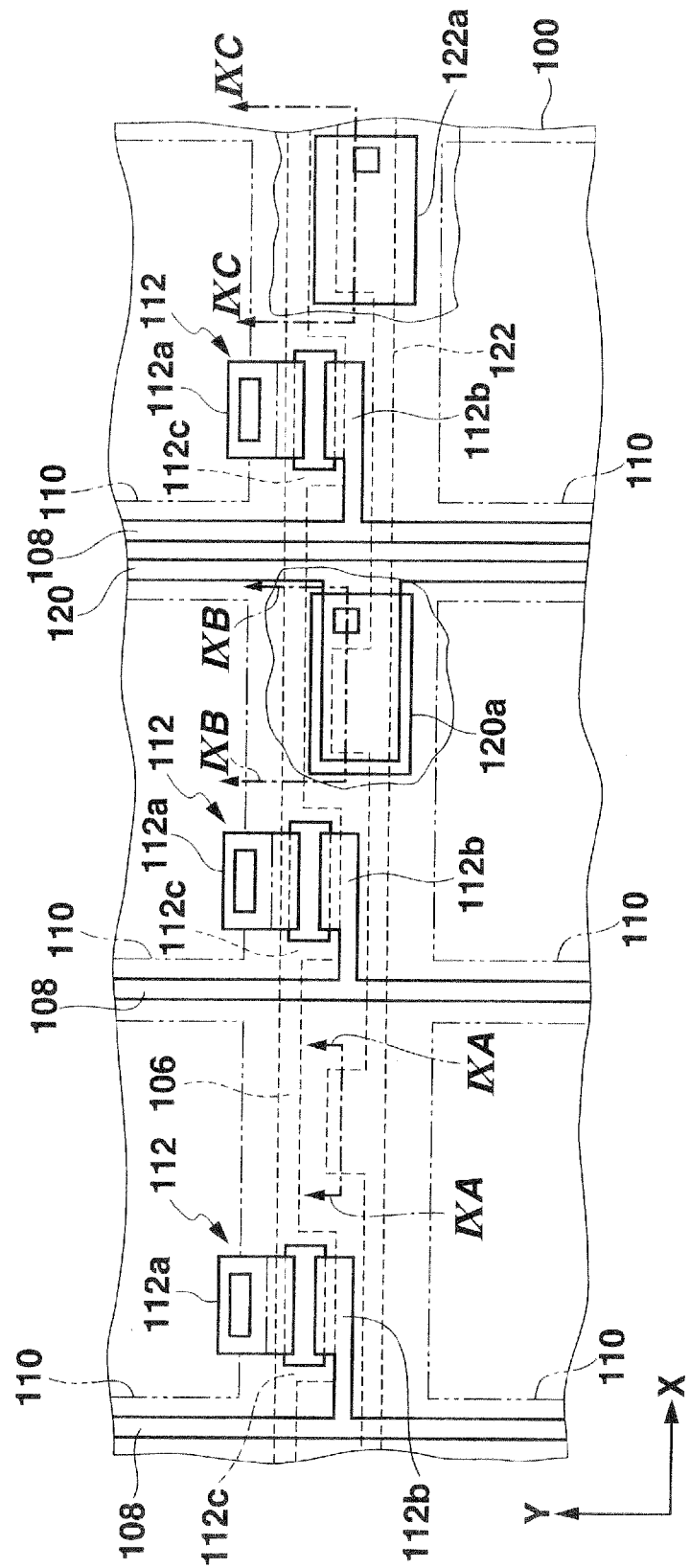
FIG. 8 is an enlarged partial planar view schematically illustrating structures of a thin film transistor (TFT), a pillar-shaped spacer corresponding portion, an X coordinate detection contact point region, and a Y coordinate detection contact point region, provided on an opposing surface of a first substrate of a TFT substrate unit of a conventional touch-type liquid crystal display apparatus with a built-in contact.
Figure 9C:
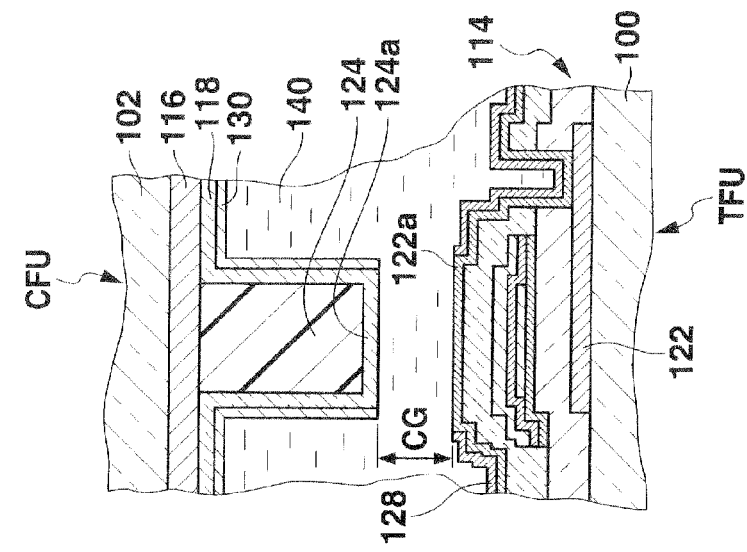
FIGS. 9A, 9B, and 9C are enlarged vertical cross-sectional views, taken along a line IXA-IXA, a line IXB-IXB, and a line IXC-IXC of FIG. 8, and schematically illustrating surroundings of the pillar-shaped spacer corresponding portion, the X coordinate detection contact point region, and the Y coordinate detection contact point region, which are provided on the opposing surface of the first substrate of the TFT substrate unit, as well as a pillar-shaped spacer and contact point protrusions, which are provided on an opposing surface of a second substrate of a CF substrate unit to correspond to the above described pillar-shaped spacer corresponding portion and the X and Y contact point regions of the TFT substrate unit.
Figure 9B:
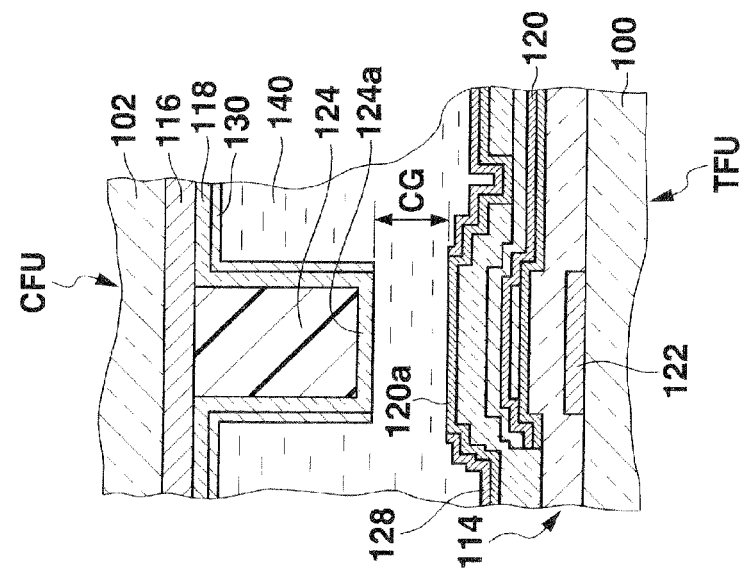
Figure 9A:
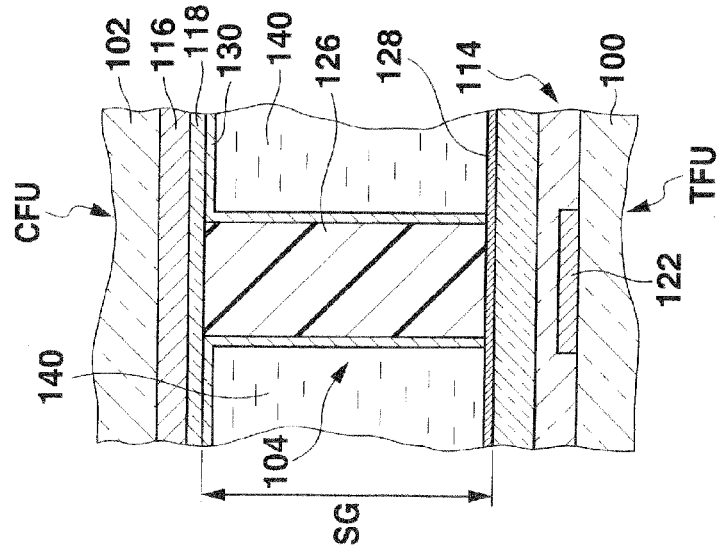

In FIG. 7B showing the vertical cross section of the base region 30 and its surrounding, a part of the conductive film 62 covered with the height adjustment portion 30b is not removed but is left.

In FIG. 7C showing the vertical cross section of a part corresponding to the first coordinate detection contact point region (the X coordinate detection contact point region) 26a and a part corresponding to the connection portion 26b of the first coordinate detection line (the X coordinate detection line) 26, a part of the conductive film 62 corresponding to the first coordinate detection contact point region (the X coordinate detection contact point region) 26a and a part of the conductive film 62 located in the contact hole 60b and connecting the first coordinate detection contact point region (the X coordinate detection contact point region) 26a to the connection portion 26b of the first coordinate detection line (the X coordinate detection line) 26 are not removed but are left.

In FIG. 7D showing the vertical cross section of a part corresponding to the second coordinate detection contact point region (the Y coordinate detection contact point region) 28a and a part corresponding to the connection portion 28b of the second coordinate detection line (the Y coordinate detection line) 28, a part of the conductive film 62 corresponding to the second coordinate detection contact point region (the Y coordinate detection contact point region) 28a and a part of the conductive film 62 located in the contact hole 60c and connecting the second coordinate detection contact point region (the Y coordinate detection contact point region) 28a to the connection portion 28b of the second coordinate detection line (the Y coordinate detection line) 28 are no removed but are left.

The following facts are understood by comparing FIG. 7A illustrating a final vertical cross section of the thin film transistor 24 taken along the line VIIA-VIIA of FIG. 1, FIG. 7B illustrating a final vertical cross section of the base region 30 taken along the line VIIB-VIIB of FIG. 1, FIG. 70 illustrating a final vertical cross section of the first coordinate detection contact point region (the X coordinate detection contact point region) 26a taken along the line VIIC-VIIC of FIG. 1, and FIG. 7D illustrating a final vertical cross section of the second coordinate detection contact point region (the Y coordinate detection contact point region) 28a taken along the line VIID-VIID of FIG. 1.

That is, a height from the opposing surface of the first substrate 12a to the protruding end face (front end) of the first coordinate detection contact point region (the X coordinate detection contact point region) 26a shown in FIG. 7C and a height from the opposing surface of the first substrate 12a to the protruding end face (front end) of the second coordinate detection contact point region (the Y coordinate detection contact point region) 28a shown in FIG. 7D are the same as to each other. A height from the opposing surface of the first substrate 12a to the protruding end face (front end) of the thin film transistor 24 shown in FIG. 7A is less by a thickness of the conductive film 62 finally removed from the protruding end face (front end) of the thin film transistor 24 than the height from the opposing surface of the first substrate 12a to each of the protruding end face (front end) of the first coordinate detection contact point region (the X coordinate detection contact point region) 26a shown in FIG. 7C and the protruding end face (front end) of the second coordinate detection contact point region (the Y coordinate detection contact point region) 28a shown in FIG. 7D. Further, a height from the opposing surface of the first substrate 12a to the protruding end face (front end) 30a of the base region 30 is more by a height from the conductive film 62 to the protruding end face (front end) 30a of the height adjustment portion 30b than the height from the opposing surface of the first substrate 12a to each of the protruding end face (front end) of the first coordinate detection contact point region (the X coordinate detection contact point region) 26a shown in FIG. 7C and the protruding end face (front end) of the second coordinate detection contact point region (the Y coordinate detection contact point region) 28a shown in FIG. 7D.

In the above described touch-type liquid crystal display apparatus with a built-in contact 10, the second substrate unit 14 having the opposed electrode 44 has the light shielding film 38 and the plurality of color filters including, e.g., red filter, green filter, and blue filter, and is referred to as the CF (Color Filter) substrate unit. However, according to a concept of the present invention, the second substrate unit 14 may not have both of the light shielding film 38 and the plurality of color filters including, e.g., red filter, green filter, and blue filter, or may not have only the light shielding film 38, or may not have only the plurality of color filters including, e.g., red filter, green filter, and blue filter.

When a liquid crystal alignment process with rubbing process, is employed, the alignment film may not be removed from each of the protruding end face (front end) of the pillar-shaped spacers 42 and that of the contact point protrusions 40, and each of the top face of the base region 30, that of the first coordinate detection contact point region (the X coordinate detection contact point region) 26a and that of the second coordinate detection contact point region (the Y coordinate detection contact point region) 28a. However, even in this case, no problem occurs in a contact between the pillar-shaped spacer 42 and the base region 30. Further, even in this case, no problem occurs in an electrical conduction between the contact point protrusion 40 and the first coordinate detection contact point region (the X coordinate detection contact point region) 26a and that between the contact point protrusion 40 and the second coordinate detection contact point region (the Y coordinate detection contact point region) 28a when the second substrate is pressed.

When a liquid crystal alignment process without rubbing process, e.g., an optical alignment process, is employed, the alignment film does not be removed from each of the protruding end face (front end) of the pillar-shaped spacers 42 and that of the contact point protrusions 40, and each of the top face of the base region 30, that of the first coordinate detection contact point region (the X coordinate detection contact point region) 26a and that of the second coordinate detection contact point region (the Y coordinate detection contact point region) 28a. However, even in this case, no problem occurs in a contact between the pillar-shaped spacer 42 and the base region 30. Further, even in this case, no problem occurs in an electrical conduction between the contact point protrusion 40 and the first coordinate detection contact point region (the X coordinate detection contact point region) 26a and that between the contact point protrusion 40 and the second coordinate detection contact point region (the Y coordinate detection contact point region) 28a when the second substrate is pressed. Therefore, the present invention can also be applied to a touch-type liquid crystal display apparatus with a built-in contact, which employs a liquid crystal alignment process without rubbing process.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A touch-type liquid crystal display apparatus with a built-in contact, comprising:
   first and second substrates which are arranged to face each other;
   a liquid crystal which is sandwiched between the first substrate and the second substrate;
   at least one opposed electrode which are provided on an opposing surface of the second substrate facing the first substrate;
   a plurality of pixel electrodes which is provided on the first substrate to face the opposed electrode, so that a plurality of pixels are formed between the pixel electrodes and the opposed electrode;
   a contact point protrusion which is formed on the opposing surface of the second substrate at a first pixel of the plurality of pixels;
   a pillar-shaped spacer which is formed on the opposing surface of the second substrate at a second pixel of the plurality of pixels, the pillar-shaped spacer being made of the same material as that of the contact point protrusion;
   a contact point region which is provided on the first substrate, wherein the contact point region faces the contact point protrusion; and
   a base region which is provided on the first substrate, wherein the base region faces the pillar-shaped spacer and the base region has a height higher than the contact point region,
   wherein a first space is located between the opposed electrode and each of the pixel electrodes and a second space which is shorter than the first space and is located between a front end of the contact point protrusion of the second substrate and the contact point region of the first substrate, by bringing a front end of the pillar-shaped spacer of the second substrate into contact with a front end of the base region of the first substrate, and
   wherein a second alignment film is formed to cover at least the opposed electrode of the second substrate, and the second alignment film is subjected to a process for a liquid crystal molecule alignment in a side of the second substrate.

2. The touch-type liquid crystal display apparatus with a built-in contact, according to claim 1, wherein the base region includes a base founding portion formed by using at least one of a plurality of materials of a thin film transistor, and a height adjustment portion laminated on the base founding portion after the thin film transistor is formed, wherein the base founding portion of the base region comprises:
a first conductive metal film of the same material as that of a gate electrode of the thin film transistor;
a first insulating film of the same material as that of a gate insulating film of the thin film transistor;
an intrinsic silicon film of the same material as that of a silicon layer of the thin film transistor;
a second insulating film of the same material as that of a channel protective layer of the thin film transistor;
an n+ silicon film of the same material as that of an ohmic layer of the thin film transistor;
a second conductive metal film of the same material as that of a drain electrode of the thin film transistor;
a third insulating film of the same material as that of an overcoat insulating film of the thin film transistor; and
a transparent conductive film of the same material as that of the pixel electrode connected to the thin film transistor, and
wherein the base founding portion is formed by laminating them on the first substrate.

3. The touch-type liquid crystal display apparatus with a built-in contact, according to claim 1, wherein the contact point region which is provided on the first substrate to face the contact point protrusion is formed by using at least one of a plurality of materials of a thin film transistor, wherein the contact point region comprises:
a first conductive metal film of the same material as that of a gate electrode of the thin film transistor;
a first insulating film of the same material as that of a gate insulating film of the thin film transistor;
an intrinsic silicon film of the same material as that of a silicon layer of the thin film transistor;
a second insulating film of the same material as that of a channel protective layer of the thin film transistor;
an n+ silicon film of the same material as that of an ohmic layer of the thin film transistor;
a second conductive metal film of the same material as that of a drain electrode of the thin film transistor;
a third insulating film of the same material as that of an overcoat insulating film of the thin film transistor; and
a transparent conductive film of the same material as that of the pixel electrode connected to the thin film transistor; and
wherein the contact point region is formed by laminating them on the first substate.

4. The touch-type liquid crystal display apparatus with a built-in contact, according to claim 1, wherein the opposed electrode is formed to cover at least the contact point protrusion and the pillar-shaped spacer of the second substrate.

5. The touch-type liquid crystal display apparatus with a built-in contact, according to claim 1, wherein the pillar-shaped spacer has the same height as that of the contact point protrusion.

6. The touch-type liquid crystal display apparatus with a built-in contact, according to claim 1, wherein the touch-type liquid crystal display apparatus comprises a plurality of contact point regions having the same height as to each other.

7. The touch-type liquid crystal display apparatus with a built-in contact, according to claim 1, wherein the touch-type liquid crystal display apparatus comprises a plurality of base regions having the same height as to each other.

8. The touch-type liquid crystal display apparatus with a built-in contact, according to claim 1, wherein the touch-type liquid crystal display apparatus comprises a plurality of contact point protrusions having the same height as to each other.

9. The touch-type liquid crystal display apparatus with a built-in contact, according to claim 1, wherein the touch-type liquid crystal display apparatus comprises a plurality of pillar-shaped spacers having the same height as to each other.

10. A touch-type liquid crystal display apparatus with a built-in contact, comprising:
first and second substrates which are arranged to face each other;
a liquid crystal which is sandwiched between the first substrate and the second substrate;
at least one opposed electrode which is provided on an opposing surface of the second substrate facing the first substrate;
a plurality of pixel electrodes which are provided on the first substrate to face the opposed electrode, so that a plurality of pixels are formed between the pixel electrodes and the opposed electrode;
a contact point protrusion which is formed on the opposing surface of the second substrate at a first pixel of the plurality of pixels;
a pillar-shaped spacer which is formed on the opposing surface of the second substrate at a second pixel of the plurality of pixels, the pillar-shaped spacer being made of the same material as that of the contact point protrusion;
a contact point region which is provided on the first substrate, wherein the contact point region faces the contact point protrusion; and
a base region which is provided on the first substrate, wherein the base region faces the pillar-shaped spacer and the base region has a height higher than the contact point region,
wherein a first space is located between the opposed electrode and each of the pixel electrodes and a second space which is shorter than the first space and is located between a front end of the contact point protrusion of the second substrate and the contact point region of the first substrate, by bringing a front end of the pillar-shaped spacer of the second substrate into contact with a front end of the base region of the first substrate,
wherein the base region includes a base founding portion formed by using at least one of a plurality of materials of a thin film transistor, and a height adjustment portion laminated on the base founding portion after the thin film transistor is formed,
wherein the base founding portion of the base region comprises:
a first conductive metal film of the same material as that of a gate electrode of the thin film transistor;
a first insulating film of the same material as that of a gate insulating film of the thin film transistor;
an intrinsic silicon film of the same material as that of a silicon layer of the thin film transistor;
a second insulating film of the same material as that of a channel protective layer of the thin film transistor;
an n+ silicon film of the same material as that of an ohmic layer of the thin film transistor;
a second conductive metal film of the same material as that of a drain electrode of the thin film transistor;
a third insulating film of the same material as that of an overcoat insulating film of the thin film transistor; and a transparent conductive film of the same material as that of the pixel electrode connected to the thin film transistor, and wherein the base founding portion is formed by laminating them on the first substrate.

11. The touch-type liquid crystal display apparatus with a built-in contact, according to claim 10, wherein the height adjustment portion of the base region is formed by laminating a fourth insulating film on the base founding portion of the base region after the transparent conductive film is formed.

12. The touch-type liquid crystal display apparatus with a built-in contact, according to claim 10, wherein the opposed electrode is formed to cover at least the contact point protrusion and the pillar-shaped spacer of the second substrate.

13. The touch-type liquid crystal display apparatus with a built-in contact, according to claim 10, wherein a second alignment film is formed to cover at least the opposed electrode of the second substrate, and the second alignment film is subjected to a process for a liquid crystal molecule alignment in a side of the second substrate.

14. A touch-type liquid crystal display apparatus with a built-in contact, comprising:
    first and second substrates which are arranged to face each other;
    a liquid crystal which is sandwiched between the first substrate and the second substrate;
    at least one opposed electrode which is provided on an opposing surface of the second substrate facing the first substrate;
    a plurality of pixel electrodes which are provided on the first substrate to face the opposed electrode, so that a plurality of pixels are formed between the pixel electrodes and the opposed electrode;
    a contact point protrusion which is formed on the opposing surface of the second substrate at a first pixel of the plurality of pixels;
    a pillar-shaped spacer which is formed on the opposing surface of the second substrate at a second pixel of the plurality of pixels, the pillar-shaped spacer being made of the same material as that of the contact point protrusion;
    a contact point region which is provided on the first substrate, wherein the contact point region faces the contact point protrusion; and
    a base region which is provided on the first substrate, wherein the base region faces the pillar-shaped spacer and the base region has a height higher than the contact point region,
    wherein a first space is located between the opposed electrode and each of the pixel electrodes and a second space which is shorter than the first space and is located between a front end of the contact point protrusion of the second substrate and the contact point region of the first substrate, by bringing a front end of the pillar-shaped spacer of the second substrate into contact with a front end of the base region of the first substrate,
    wherein the contact point region which is provided on the first substrate to face the contact point protrusion is formed by using at least one of a plurality of materials of a thin film transistor,
    wherein the contact point region comprises:
    a first conductive metal film of the same material as that of a gate electrode of the thin film transistor;
    a first insulating film of the same material as that of a gate insulating film of the thin film transistor;
    an intrinsic silicon film of the same material as that of a silicon layer of the thin film transistor;
    a second insulating film of the same material as that of a channel protective layer of the thin film transistor;
    an n+ silicon film of the same material as that of an ohmic layer of the thin film transistor;
    a second conductive metal film of the same material as that of a drain electrode of the thin film transistor;
    a third insulating film of the same material as that of an overcoat insulating film of the thin film transistor; and
    a transparent conductive film of the same material as that of the pixel electrode connected to the thin film transistor, and
    wherein the contact point region is formed by laminating them on the first substrate.

15. A touch-type liquid crystal display apparatus with a built-in contact, comprising:
    first and second substrates which are arranged to face each other;
    a liquid crystal which is sandwiched between the first substrate and the second substrate;
    at least one opposed electrode which is provided on an opposing surface of the second substrate facing the first substrate;
    a plurality of pixel electrodes which are provided on the first substrate to face the opposed electrode, so that a plurality of pixels are formed between the pixel electrodes and the opposed electrode;
    a contact point protrusion which is formed on the opposing surface of the second substrate at a first pixel of the plurality of pixels;
    a pillar-shaped spacer which is formed on the opposing surface of the second substrate at a second pixel of the plurality of pixels, the pillar-shaped spacer being made of the same material as that of the contact point protrusion;
    a contact point region which is provided on the first substrate, wherein the contact point region faces the contact point protrusion; and
    a base region which is provided on the first substrate, wherein the base region faces the pillar-shaped spacer and the base region has a height higher than the contact point region,
    wherein a first space is located between the opposed electrode and each of the pixel electrodes and a second space which is shorter than the first space and is located between a front end of the contact point protrusion of the second substrate and the contact point region of the first substrate, by bringing a front end of the pillar-shaped spacer of the second substrate into contact with a front end of the base region of the first substrate, and
    wherein the opposed electrode is formed to cover at least the contact point protrusion and the pillar-shaped spacer of the second substrate.

16. A touch-type liquid crystal display apparatus with a built-in contact, comprising:
    first and second substrates which are arranged to face each other;
    a liquid crystal which is sandwiched between the first substrate and the second substrate;
    at least one opposed electrode which is provided on an opposing surface of the second substrate facing the first substrate;
    a plurality of pixel electrodes which are provided on the first substrate to face the opposed electrode, so that a plurality of pixels are formed between the pixel electrodes and the opposed electrode;

a contact point protrusion which is formed on the opposing surface of the second substrate at a first pixel of the plurality of pixels;
a pillar-shaped spacer which is formed on the opposing surface of the second substrate at a second pixel of the plurality of pixels, the pillar-shaped spacer being made of the same material as that of the contact point protrusion;
a contact point region which is provided on the first substrate, wherein the contact point region faces the contact point protrusion; and
a base region which is provided on the first substrate, wherein the base region faces the pillar-shaped spacer and the base region has a height higher than the contact point region,
wherein a first space is located between the opposed electrode and each of the pixel electrodes and a second space which is shorter than the first space and is located between a front end of the contact point protrusion of the second substrate and the contact point region of the first substrate, by bringing a front end of the pillar-shaped spacer of the second substrate into contact with a front end of the base region of the first substrate, and
wherein a first alignment film is formed to cover at least the pixel electrode, the contact point region, and the base region of the first substrate, and the first alignment film is subjected to a process for a liquid crystal molecule alignment in a side of the first substrate.

* * * * *

UNITED STATES PATENT AND TRADEMARK OFFICE
CERTIFICATE OF CORRECTION

Page 1 of 1

PATENT NO. : 8,817,221 B2
APPLICATION NO. : 13/226751
DATED : August 26, 2014
INVENTOR(S) : Kazuhiro Sasaki It is certified that error appears in the above-identified patent and that said Letters Patent is hereby corrected as shown below:

In the Specification

Column 1, Line 8-9, delete "2010-201153" and insert --2010-201453--.

In the Claims

Column 21, Claim 3, Line 53, delete "substate" and insert --substrate--.

Signed and Sealed this
Seventeenth Day of March, 2015

Michelle K. Lee
*Director of the United States Patent and Trademark Office*